United States Patent
Papa

(10) Patent No.: US 11,831,587 B2
(45) Date of Patent: Nov. 28, 2023

(54) 6G ORAN STAR ARRAY WITH SIMULTANEOUS TRANSMIT AND RECEIVE

(71) Applicants: Parallel Wireless, Inc., Nashua, NH (US); Innophase, Inc., San Diego, CA (US)

(72) Inventor: Steven Paul Papa, Windham, NH (US)

(73) Assignee: Parallel Wireless, Inc., Nashua, NH (US)

( * ) Notice: Subject to any disclaimer, the term of this patent is extended or adjusted under 35 U.S.C. 154(b) by 60 days.

(21) Appl. No.: 17/369,951

(22) Filed: Jul. 7, 2021

(65) Prior Publication Data
US 2022/0014348 A1    Jan. 13, 2022

Related U.S. Application Data

(60) Provisional application No. 62/705,598, filed on Jul. 7, 2020.

(51) Int. Cl.
*H04L 5/14*    (2006.01)
*H04B 7/0452*    (2017.01)
*H04B 1/44*    (2006.01)

(52) U.S. Cl.
CPC .......... *H04L 5/1461* (2013.01); *H04B 1/44* (2013.01); *H04B 7/0452* (2013.01)

(58) Field of Classification Search
CPC ........ H04L 5/1461; H04B 1/44; H04B 7/0452
USPC ......................................... 370/276, 277, 278
See application file for complete search history.

(56) References Cited

U.S. PATENT DOCUMENTS

| | | |
|---|---|---|
| 2015/0011172 A1 | 1/2015 | Reinhardt |
| 2015/0263780 A1* | 9/2015 | Mehlman ............. H04B 1/0475 375/219 |
| 2015/0270865 A1 | 9/2015 | Polydoros et al. |
| 2015/0318976 A1* | 11/2015 | Eltawil .................. H04B 1/44 370/278 |
| 2016/0056946 A1 | 2/2016 | Moher |
| 2016/0285486 A1 | 9/2016 | Qin et al. |
| 2017/0063427 A1* | 3/2017 | Lee ........................ H04B 1/525 |
| 2021/0058110 A1* | 2/2021 | Zhang ................... H04B 1/582 |
| 2022/0321163 A1* | 10/2022 | Avraham ............... H04B 1/525 |

OTHER PUBLICATIONS

Enserink, S. et al.: "Joint Analog and Digital Interference Cancellation", 2014 IEEE MTT-S International Microwave Symposium (IMS2014), 2014, pp. 1-3, doi: 10.1109/MWSYM.2014.6848493.

\* cited by examiner

*Primary Examiner* — Obaidul Huq
(74) *Attorney, Agent, or Firm* — Michael Y. Saji

(57) ABSTRACT

A system and method for providing interference cancellation for simultaneous transmit and receive are presented. In one embodiment, the system includes an analog stage including a transmit chain receiving a first digital transmit signal and providing an analog transmit signal output, an auxiliary transmit chain receiving a second digital transmit signal and providing an analog interference cancellation signal output, and a receive chain receiving an analog receive signal input and the analog interference cancellation signal and providing a digital receive signal output; and a digital stage in communication with the analog stage, and including a cancellation system receiving a digital transmit signal and providing the first digital transmit signal and the second digital transmit signal and receiving the digital receive signal and providing a filtered receive signal.

15 Claims, 9 Drawing Sheets

6G ORAN STAR ARRAY WITH SIMULTANEOUS TRANSMIT AND RECEIVE

CROSS-REFERENCE TO RELATED APPLICATIONS

This application claims priority under 35 U.S.C. § 119(e) to U.S. Provisional Pat. App. No. 62/705,598, filed Jul. 7, 2020, titled "6G ORAN Star Array With Simultaneous Transmit And Receive" which is hereby incorporated by reference in its entirety for all purposes. This application hereby incorporates by reference U.S. patent application Ser. Nos. 16/286,548 and 16/866,540. Further, the following documents are hereby incorporated by reference: U.S. patent application Ser. Nos. 15/377,902 and 15/623,369; 13/889,631, 14/642,544, 15/464,333, 16/424,479; and 16/782,057 and 16/655,225.

BACKGROUND

Simultaneous Transmit and Receive (STAR) is anticipated to be an essential part of 6G as it can double throughput while using the same spectrum as 5G.

STAR (Simultaneous Transmit and Receive), also known as active interference cancellation, is a relatively new capability to improve interference resilience in communications networks. When implemented, STAR allows for concurrently transmitting and receiving on the same spectrum.

SUMMARY

A system is disclosed to for providing interference cancellation for simultaneous transmit and receive. In one embodiment the system includes an analog stage including a transmit chain receiving a first digital transmit signal and providing an analog transmit signal output, an auxiliary transmit chain receiving a second digital transmit signal and providing an analog interference cancellation signal output, and a receive chain receiving an analog receive signal input and the analog interference cancellation signal and providing a digital receive signal output; and a digital stage in communication with the analog stage, and including a cancellation system receiving a digital transmit signal and providing the first digital transmit signal and the second digital transmit signal and receiving the digital receive signal and providing a filtered receive signal.

In one embodiment, a method may be disclosed for providing interference cancellation for simultaneous transmit and receive by a cancellation system having a digital stage and an analog stage. The method includes receiving a first digital transmit signal at the analog stage of a cancellation system and providing an analog transmit signal output; receiving a second digital transmit signal at the analog stage of the cancellation system and providing an analog interference cancellation signal output; receiving an analog receive signal input and the analog interference cancellation signal and providing a digital receive signal output; receiving at the digital stage in communication with the analog stage, a digital transmit signal and providing the first digital transmit signal and the second digital transmit signal; and receiving the digital receive signal and providing a filtered receive signal.

DETAILED DESCRIPTION

Figure 1:
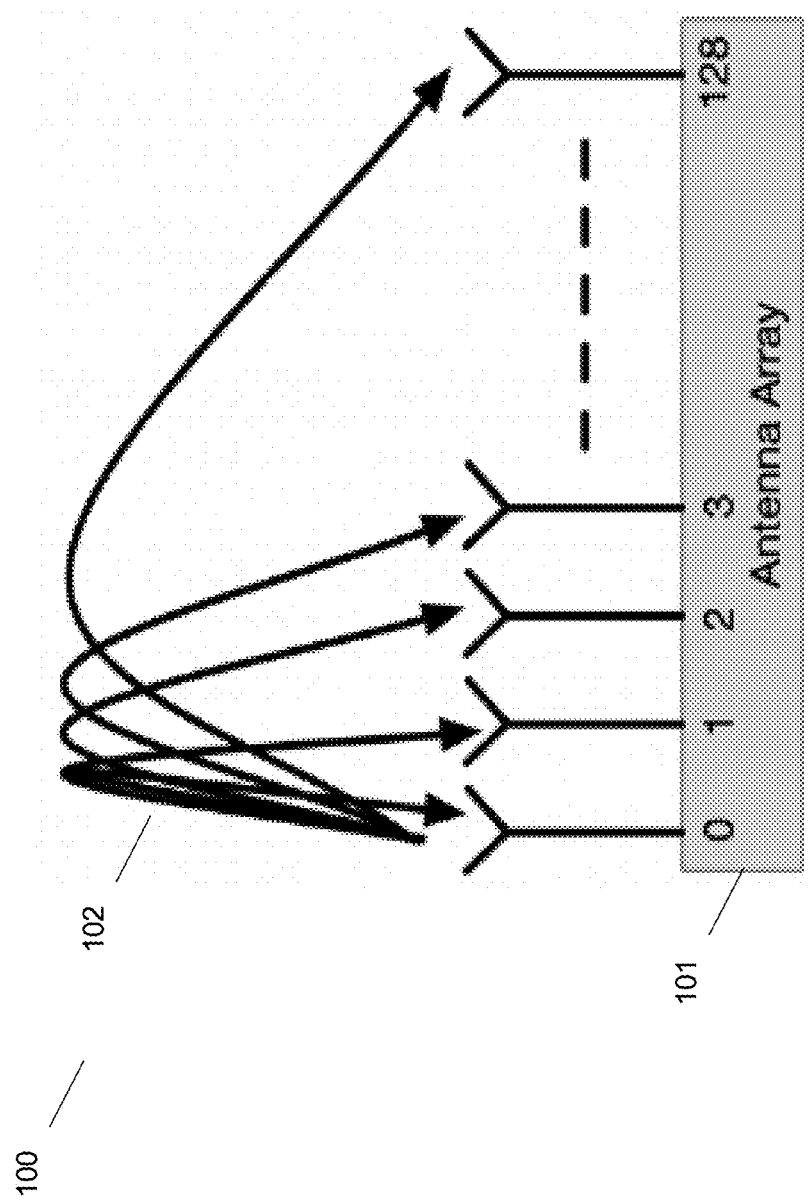
FIG. 1 is a diagram showing a STAR interference pattern.

Parallel Array of CMOS Elements (PACE) is Parallel Wireless's innovative Massive MIMO architecture using our custom Fi-RoC chipset. We have developed an ORAN-standards compliant STAR PACE that brings STAR benefits to 5G and sets up a software-based evolution to 6G. STAR PACE benefits include more effective spectrum sharing, more resilience to radar interference, and more throughput from 5G spectrum. Although some embodiments may be used on sub 6 GHz TDD starting with the 3.5 GHz CBRS band, but our technology is equally applicable for FDD.

Described herein is a new macro/small cell that will be capable of operating as 4G and 5G cell at the same time at the same frequency. Traditionally, the new generation of devices are first introduced in a new spectrum before the old generation networks are phased out. With the scarcity of spectrum in sub-6 GHz frequency range, the 5G NR cells are forced to be developed for very limited frequency bands. The inventors have recognized the value of a macro and/or small cell that will be able to operate 4G and 5G at the same time in the same frequency. In some embodiments, the disclosed device performs simultaneous downlink/uplink as well as unsynchronized downlink/uplink. With interference cancelling technology, the two cells 4G and 5G operates as completely independent cell systems.

Two technologies that enable this system are MIMO and interference cancellation. With massive MIMO beam-forming, 4G and 5G radios can simultaneously point their beam towards independent users for uplink and downlink reception. This technology is used, in some embodiments, for systems ranging from 4T4R to 64T64R and higher, and each antenna configuration will have varying amounts of interference cancellation requirement. The interference cancellation at the base station allows for simultaneous operation of 4G downlink and 5G uplink vice versa allowing for the same spectrum to be shared between 4G and 5G. This will work with unequal bandwidth between 4G and 5G (for example 4G can be 20 MHz and 5G can be 100 MHz) and it will also work with 4G being FDD cells and 5G TDD cells.

There are multiple applications of massive MIMO interference cancellation.

The first application of interference cancellation is inter-beam interference cancellation. The larger the number of antennas the sharper the beam and larger the inter-beam isolation and consequently less cancellation is required. But with smaller antenna configurations, interference cancellation is required to ensure inter-beam isolation. In this case, interference cancellation improves the SINR of the system.

The second application is also based on inter-beam interference cancellation, but simultaneous transmit and receive (STAR) at the base station can be achieved with interference cancellation if the two user equipment (UEs) are spatially separated and use different beams. One UE could be transmitting 5G waveform to the base-station (uplink) while the other UE is receiving a 4G waveform from the base-station (downlink). In this scenario, interference cancellation is required only at the base-station. The downlink transmit interference is canceled at the uplink receive antennas. A subset of the antenna array could be used for transmit and the remaining could be used for receive. This is the case of separate antennas used for STAR operation. However, if all antennas are used for transmit and receive, the TR switch will have to be replaced with a circulator. Some antenna isolation is achieved with a circulator and interference cancellation provides the rest of the isolation and this leads to the case of the same set of antennas achieving STAR operation.

The third application is STAR with a UE which is also equipped with interference cancellation. In this case, the same beams are used for transmit and receive simultaneously between the base-station and the UE, thereby doubling the bidirectional throughput.

In some embodiments, digital and analog cancellation technologies are used alongside commercial off the shelf (COTS) Massive MIMO array components. The integration of the two in both TDD and FDD configuration is contemplated. In one embodiment, the analog interference cancellation uses optical signal processing using a photonic fabric which is trained using a stochastic gradient algorithm implemented digitally on an FPGA or DSP. The analog cancellation system itself is an RF-in, RF-out module and includes a laser and a photo-diode which couples seamlessly into any RF signal chain. In a further embodiment, a calibration signal is transmitted from each antenna element, and the corresponding interference signal is measured at each antenna element, including at the transmitting element. In either embodiment, a set of pair-wise interference channel measurements are obtained. The digital canceler can also be implemented on the same FPGA or DSP. The digital canceler can be implemented using an analog domain circuit in CMOS, or using a ML compute chip.

One aspect of scaling the architecture to a massive MIMO solution is to provide the cancellation between the transmit and receive antenna array. In theory, a signal transmit from each antenna can cause interference to each of the receive antennas. In some embodiments, an auxiliary interference cancellation signal is generated for each pair of the transmitter and receiver signal processing chains.

Described herein is a novel architecture that provides interference cancellation combined with the use of a tile-based architecture for scaling massive MIMO solution. In various embodiments, the data throughput transfer between each of the radio units is reduced to thus reduce the SERDES throughput requirement and meet the latency constraints for providing the cancellation signal.

The digital systems of each of the radio units are connected together with the other radio units to provide the cancellation signals. The architecture is described using four radio units which can be scaled to a massive scale (see e.g., FIG. 3). The digital connections between the digital control and cancellation system will send digital sample signals between the radio units.

In some embodiments, a shared device, either UE or base station, is configured to work across multiple carrier networks, including government, military, or public safety carriers. The device can allow some of the UL to also transmit to special UEs and at same time listen to those same UEs on the DL. Provides a transition path to full duplex where the special UEs are using the capacity for fixed wireless in advance of handsets with the capability.

In some embodiments, an Option 7.1 split interface is used for interference cancellation compensation signals. In ORAN, Option 7.1 is a protocol that carries subcarrier IQ streams. This protocol can be extended, in some embodiments, to define a negative subcarrier space (protocol) for sending an auxiliary interference cancellation stream that is carried in the same ORAN 7.1 interface. The same protocol has been extended to provide the supplemental uplink and supplemental downlink needed by the STAR transmitter. The STAR transmitter may utilize, in some embodiments, three or more IQ sample streams: normal TX data; interference cancellation data based on the RX signal; and additional IQ samples to be transmitted during the time that the transmitter is configured to be in receive mode.

In some embodiments, sufficient bandwidth is provided on the Fi-RoC chip to enable all required streams to be sent in one direction on the SERDES for transmit. In some embodiments, equivalent bandwidth in the other direction is provided on the SERDES for IQ streams for the receive chain. In some embodiments, up to 6× or more of the bandwidth is enabled by a high-speed SERDES. In some embodiments, 18 Gb/s is made available for 100 MHz of carrier bandwidth. The Fi-RoC takes that, drives the primary TX, and drives a second TX to go into the receiver. Either FDD or TDD may be supported, in some embodiments. In some embodiments, the same or similar ORAN interfaces may be used to add on additional data streams, such as location services data.

In some embodiments, connection points may be placed to enable a second die in a two die package (with appropriate energy consumption/thermals for a single 1T1R unit). In some embodiments, the transmitter can be provided with an IQ stream or multiple IQ streams as described herein. The IQ stream could be to the ADC itself and have the reflections processed there. Connection points may be selected that create the lowest latency approach given we have a completely integrated/collapsed RFFE. In some embodiments, a connection point using an ORAN compatible protocol and an ORAN Option 7.1 split are contemplated.

In some embodiments, a method is disclosed wherein the auxiliary interference cancellation signal is formed from two separate components. A first interference cancellation component is able to cancel a self-interference signal representing a direct loopback of a signal transmitted by a transmit signal processing chain at an antenna and immediately received at the that antenna's receive signal processing chain. The first component is obtained from a signal coupler that monitors the IQ stream before the power amplifier, giving us microseconds of latency to manipulate the first component based on a self-interference calibration or measurement. The self-interference model may be based on comparing the signal to be transmitted to what is received. Thus, the self-interference model may include characteristics of the PA and any signal cross-coupling or even reflections caused by the signal and build a predictive model. Thus, the IQ stream associated with a given antenna may be monitored, and based on predicted cross-coupling and reflections, an auxiliary self-interference cancelation signal is injected into receiver to cancel out that energy. The self-interference model may be implemented using an analog circuit to provide extremely low latency, with reasonable energy/cost.

The second component of the auxiliary interference cancelation signal may be formed from an aggregation of all the other antenna elements (or, in some embodiments, a subset of the other array elements) and their respective transmit signals that are received as interference at a given antenna element. In a calibration procedure, the interference between any two antenna elements may be measured to obtain a pair-wise interference measurement, such as shown in FIG. 1. Then, at the interference cancellation processor, the second component of each auxiliary interference cancelation may be generated for each receive signal processing chain in the array. That is, each digital transmit signal may be processed according to its pair-wise interference measurement for a given receive chain, and the summation of such interferences may be obtained. This aggregated interference may then be provided to the FiROC transceiver in IQ-OFDM subcarrier format (i.e., magnitudes and phases of each of a plurality of subcarriers) and converted using an inverse fast-Fourier transform (IFFT), converted to an analog signal by the auxiliary DAC and then injected into the receive signal processing chain to remove the additional interference components.

To reduce the number of samples exchanged between the radio units, streams of signals are taken from upwards in the transmit chain to reduce the data bandwidth required between each of the radio unit, in some embodiments.

Aggregation radio units: The transfer of the transmit signal from one radio unit to each of the other radio units can create a fully connected topology. To avoid the square increase in the amount of data lanes required between the digital units, few radio units can act as aggregation points where the data can be aggregated before moving it forward. An example of such an aggregation is TX1-TX3 data can be aggregated in a filter form for transfer to Radio Unit 4.

In some embodiments, STAR for PACE is enabled by our team's 5G ORAN Radio on CMOS (Fi-RoC) chips. Our Fi-RoC microelectronics R&D program has over 15 years of lineage, numerous test chips and represents the world's first "Post-SDR and Post-GaN" 5G array architecture. In some embodiments, our Fi-RoC microelectronics pipeline is leveraged to support scalable STAR architectures with full 5G support and ORAN-standard interface compatibility for easy testbed insertion and usage.

There are many challenges to implementing STAR in 5G that are met by Fi-RoC: SWaP-c. STAR arrays need to be both SWaP efficient and cost effective for commercial success. PACE uses inexpensive and efficient CMOS chips and power amplifiers, in some embodiments.

Interoperable with legacy 5G UEs. STAR PACE can transmit to STAR UEs while listening to standard 5G UEs. STAR PACE receives from STAR UEs with full isolation from standard UEs via precise beamforming as 128TR yields tighter beams, in some embodiments.

Interoperable with adjacent users of spectrum. STAR faces challenges from out of band spectrum emissions when used at a cell site that has users of immediately adjacent spectrum in the same band. STAR PACE supports a full 200 mhz with multiple carriers to ensure shared infrastructure as a deployment topology, in some embodiments.

Increased Spectral Efficiency on Downlink from PACE Base Stations. While we can achieve a full doubling of capacity with all STAR UEs, we need to operate with legacy UEs thus we propose multiple techniques to improve spectrum utilization while allowing for legacy interoperability.

The same microelectronics for STAR UEs are used, in some embodiments, as "fixed wireless UEs"—providing DL on the pre-existing UL will provide a 33% increase in DL capacity with typical 75:25 DL:UL splits. Furthermore, enhancing the base stations' scheduler to use UL on pre-existing DL, provides further increases in spectrum utilization and efficiency gains.

STAR UEs with analog beamforming. We reuse our same low-cost semiconductor for analog beamformed fixed wireless UE arrays, in some embodiments, that can provide the smallest RF footprint (narrow beams) and maximize spectrum re-use alongside legacy non-STAR UEs.

Today STAR architectures attempt to augment legacy COTS semiconductors—rather, in some embodiments, the present disclosure is designed to embed STAR capability right into the 5G integrated RF front-end semiconductor.

Normally STAR processing algorithms are racing the primary digital signal processing chain with a significant latency disadvantage. Through proper placement and integration in Fi-RoC's integrated digital RF chain we significantly improve the latency budget. This is huge architectural simplification that provides 10× SWaP improvement and saves latency to give us more time to compute the interference cancellation with COTS CMOS for further cost benefits, in some embodiments.

We are able to do this new STAR integration into PACE successfully for several reasons:

We have the world's first fully-integrated 5G radio on CMOS—(Fi-ROC). It is both the first fully integrated lower PHY through to the Power Amplifier (PA) and is the first to do so in all CMOS. CMOS allows for us to implement additional computation at very low cost and latency; Fi-RoC has much reduced Out of Band (OOB) emissions thus less interference to cancel.

As well, Fi-RoC's built-in power amplifier requires very limited and very predictable linearization, thus we avoid digital-pre-distortion steps and can predict OOB emissions and PIM at the beamformer versus requiring individual collection of IQ streams at the RFIC. This is an architectural simplification that enables a SWaP improvement and saves latency, giving us more time to compute the interference cancellation with COTS CMOS for further SWaP benefits. Embedding STAR directly in CMOS also ensure the same low-cost solution, and same R&D, can be leveraged for both the base station and the UE.

We have also been incorporating Simultaneous Self-interference Cancellation (S-SIX) that enables STAR operation on commercial and military radios. S-SIX cancels the multi-path reflections from nearby scatterers that also interfere with the weak receive signal and removes adjacent channel leakage or out-of-band emissions into neighboring channels. S-SIX employs hybrid analog (photonic and RF) and digital signal processing techniques leveraging a proprietary ultra-low loss photonic platform to achieve beyond state-of-the-art interference cancellation. The solution can double the bandwidth of current tactical radios and can achieve over an order of magnitude increase in total network throughput while enabling simultaneous transmit and receive (STAR) operation. S-SIX is frequency agnostic and waveform agnostic. The resulting isolation from the transmitter to receiver will ensure compelling STAR performance in a wide variety of 5G situations.

The interference cancellation architecture is built up in two stages: analog and digital. Both stages of cancellation work together to provide interference free communication from the direct leakage of the transmit signal from the transmitter to the receiver as well as the leakage by echo reflection of transmit signal coming back into the receive. The analog stage provides the cancellation of a high power signal before it enters the receive chain. The auxiliary cancellation signal enters the receive chain before the low noise amplifier. As described above, the auxiliary cancellation signal may be generated from two components—a first representing an array-element specific self interferences, and a second representing interference from adjacent array elements. The digital system is used to control the analog canceler to adapt with changing channel conditions and provide appropriate delay and amplitude control mechanisms to provide cancellation. The digital system is also capable of cancelling the remaining residual interference signal which can comprise linear and non-linear leakage from the transmitter. In some embodiments, the digital interference cancellation may measure any residual interference by correlating a given receive signal with transmit signals from adjacent antenna array elements. Any such residual interference may then be cancelled in the OFDM frequency domain data obtained from the receive signal processing chains.

The interference cancellation capability can provide: (1) Relaxed Front end diplexer filters: The current diplexer filters are bulky and expensive especially for cellular frequencies. Diplexer filters are used to improve the isolation of transmitters and receivers. The diplexer however uses fixed frequency function to isolate the transmit and receive. It is unable to cancel the interference leakage due to non linearity of the transmit in the receive frequency band. (2) An active interference cancellation filter can provide isolation as well as cancellation of non linear leakage signals between the transmitter and the receiver.

Today's radios either transmit or receive in a given frequency at a given time. With the introduction of an interference cancellation system, the radio can provide full duplex function.

Simultaneous Self-Interference Cancellation (S-SIX) has already been implemented in a variety of testbeds including commercial and tactical applications. One example of S-SIX implementation is shown in the system 100 FIG. 1. System 100 includes an antenna array 101 and interference signals 102. A transmit from each antenna element can cause interference at each receive antenna. The interference can occur from near filed and far field reflections requiring computation of the interference channel for each of the antenna pair.

Figure 2A:
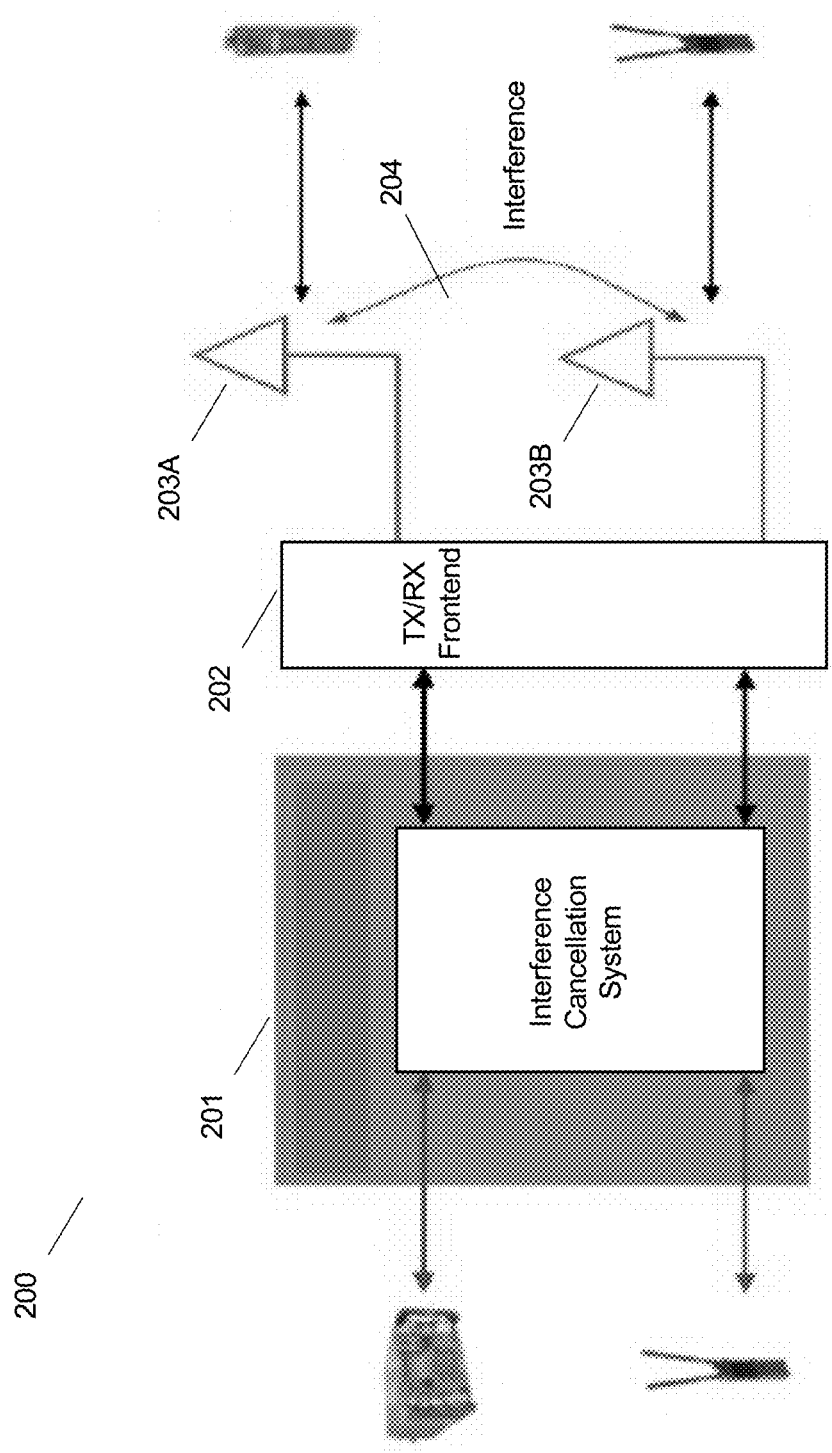
FIG. 2A is a system diagram showing an interference cancellation system, in accordance with some embodiments.

FIG. 2A shows the overall system 200 including the S-SIX system 201, the TX/RX front-end 202, antenna 203A and 203B and interference 204.

Figure 2B:
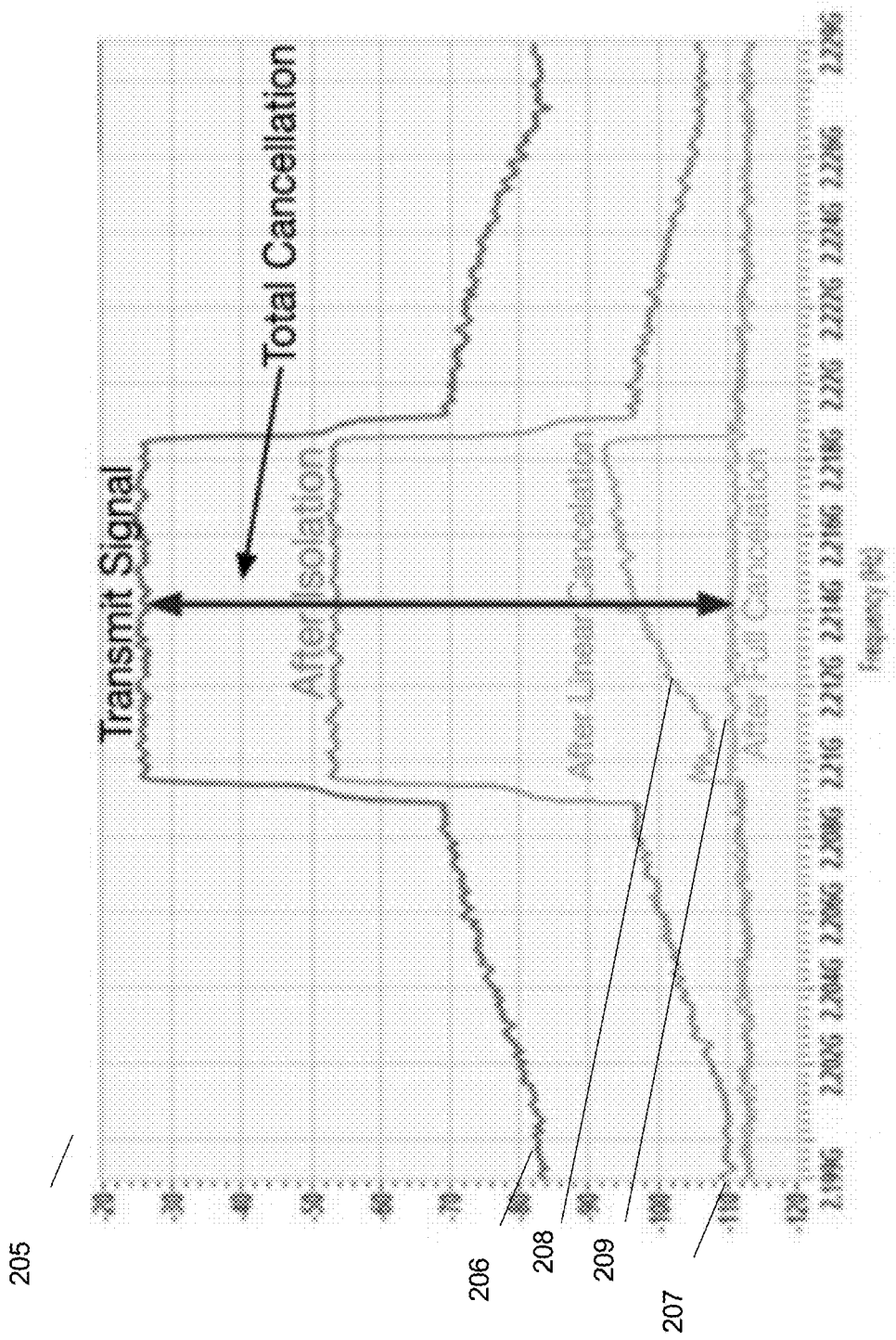
FIG. 2B is a diagram showing different signals from an interference cancellation system, in accordance with some embodiments.

FIG. 2B is a graph 205 showing the transmit signal 206, the signal after isolation 207, the signal after linear cancellation 208 and the signal after full cancellation 209.

Parallel Wireless uses a modular ORAN 7.2-split designed for flexibility, performance and upgradeability by using COTS equipment with our software-driven solutions. This approach will also aid our final integration with the 5G testbed since ORAN is an open and standard-based interface designed for interoperability.

Best SWaP for larger numbers of elements, more elements provide more transmission opportunities for normal UEs and STAR UEs to co-exist. Minimal OOB from linearization including strong predictability [or even economical replication] to avoid needing duplicative aggregation of transmit data. Completely integrated RFFE in CMOS for MP-MIMO provides straightforward insertion points for STAR functionality inclusive of DSP processing for digital interference cancellation. Same device can be used for STAR UE. Other than spinning the Fi-RoC chip, the rest of STAR can be implemented with COTS semiconductors

| Challenge | Innovation | Key Benefits |
| --- | --- | --- |
| Integrated RFFE with STAR | Embed several new interfaces in the Fi-RoC: digital anti-signal input, analog anti-signal output for first ever STAR in 5G | Scalable Performance: Superior coverage, LPI/LPD, significantly lower SWAP and with 10x better power efficiency and reusability |
| Integrated DAC for analog anti-signal | Using similar DAC to primary system DAC provide a second signal that can drive interference cancellations signals directly into LNA | Latency: On-chip DAC will provide lowest latency SWaP: By integrating into single die, cost is substantially reduced |
| Integrate anti-signal data into Option 7.1 interface | Use standard ORAN 7.1 interface to carry anti-signal data for interference cancellation. Use Option 7.1 DSP on Fi-RoC for integrating any digital cancellation information | SWaP: By integrating into existing digital sub-systems for ORAN 7.1 cost is reduced Interoperability: The new approach pioneered here (industry-first) will be portable to other Option 7.1 innovators in the future |
| Systems-Level View of Transmit Signals | Intercept the digital IQ streams before the option 7.1 interface and perform operations in the time domain versus the frequency domain using same FPGA that is applying the beam forming pre-coding matrix to individual IQ streams. | Latency: By intercepting the transmit signals earlier we have more time to compute the cancellation information. SWaP: By using existing digital sub-systems significant cost/complexity reduction. Normally an entirely mirrored digital signal collection apparatus would be required. |
| Use of UL spectrum as supplement downlink for STAR UEs | We implement the STAR carrier to appear as supplemental downlink spectrum for UEs capable of seeing it. | 3GPP standard: We need no changes other than defining a new band. |

| Challenge | Innovation | Key Benefits |
| --- | --- | --- |
| Beamforming in presence of heterogeneous UEs with and without STAR capability | We implement the STAR carrier to appear as a supplement uplink for UEs capable of seeing it and ensure the scheduler only makes available for STAR UEs with sufficient isolation from non-STAR UEs (typically STAR UEs with highly directional RF). | 3GPP standard: We implement using standard scheduling information available to the beamformer and X2 interface. |

Present efforts at interference cancellation tend to augment existing design patterns with additional circuitry. For example the proven S-SIX intercepts the IQ stream at the SDR, races to compute the interference compensation (leading to exotic computation approaches given the latency budget), then emits that as a compensation stream through a DAC for direct transmission to the LNA and SDR. With the Fi-RoC's minimal linearization requirements and PACE's MP-MIMO architecture we have the opportunity for much earlier interception of the transmit signal where it is aggregated at the beamformer—this providers a much bigger latency budget (easing computation) and a much lower cost implementation if the compensation signals can be transmitted along the 7.1 ORAN interface in to the same RFFE as the primary transceiver.

System Design and Requirements Analysis:

PACE: Key components include MP-MMIMO (Massively Parallel Massive MIMO) Digital system, Digital Beam Forming Software for MP-MMIMO, Fi-RoC RFFE through antenna element, System-level (element layout, sync, power, thermals.) The result is a much simpler design with lower cost components. As a first step toward building a 128TR STAR PACE Array we will build a 2T2R STAR PACE Prototype that maximizes use of existing components from individual team members.

MP-MMIMO Digital system (LL1, Option 7.2). We support both forms of Option 7.2 with the precoding matrix computed on the DU or the RU. Note the multiple daisy chains of Fi-RoC chips simplifying layout and thermals.

STAR for 2T2R MIMO: STAR system for the MIMO system is built to provide interference free reception at the antenna array where each transmit and receive pair is also an interference pair. That is, each transmit antenna can cause interference at each receiving antenna. Below is an example of a 2×2 MIMO antenna system, where the S-SIX system generates the antidote signal and injects it through the Fi-ROC architecture. Interference cancellation inside this architecture greatly helps the FDD filtering problem and greatly enhances the shared infrastructure argument.

Figure 3:
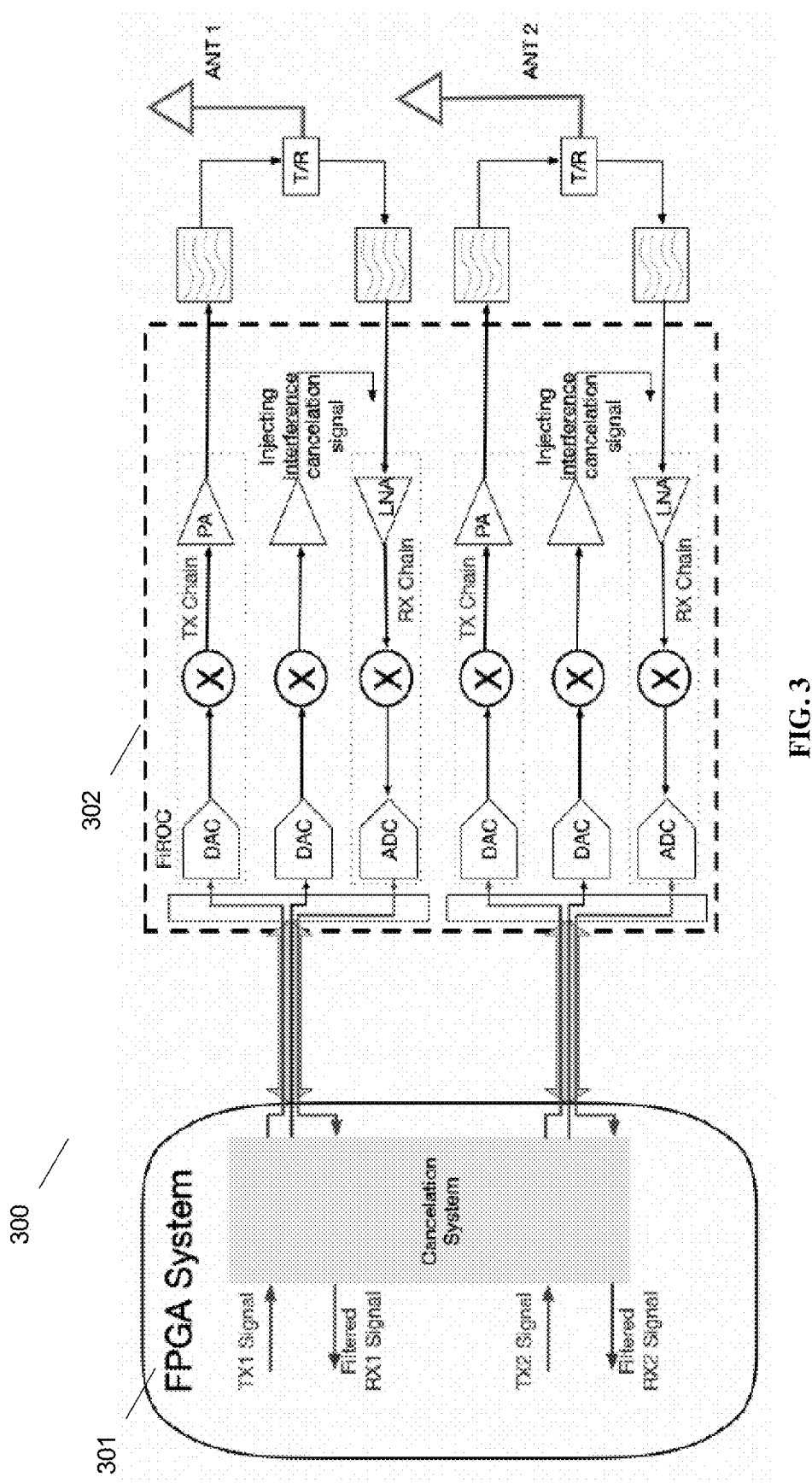
FIG. 3 is a block diagram of a radio and cancellation system, in accordance with some embodiments.

A high-level block diagram of the radio and cancellation system 300 is provided in FIG. 3. The cancellation system includes an analog canceler 302 and digital canceler 301. The analog canceler provides the first stage of cancellation and reduces the highest interference signal by a substantial margin such that the residual signal is within the dynamic range available on CoTS low cost analog to digital (A/D) and digital to analog (D/A) converters and radios.

2T2R MIMO design allows for modular iteration. The interference cancellation happens in two stages: Analog and Digital. In the analog stage, the antidote to interference signal is injected before the LNA via an auxiliary transmit chain. The digital stage subsequently cancels the remaining interference signal at the FPGA system.

Scaling STAR for Massive MIMO: A signal transmit from each antenna can cause interference to each of the receive antennas. This uses an interference cancellation for each pair of the transmitter and receiver. When scaled to a massive number of antennas like 128T128R, the interference pattern becomes a large 128×128 matrix. We will solve the scaling of STAR with the S-SIX architecture by:

Use the aux transmit chain in the Fi-ROC to inject the antidote signal right before the LNA. The antidote signal here generated for each receive chain contains the antidote for interference from all 128 transmitters.

Generation of antidote signal on the FPGA architecture by bringing all of the transmit signals into a single IP.

Figure 4:
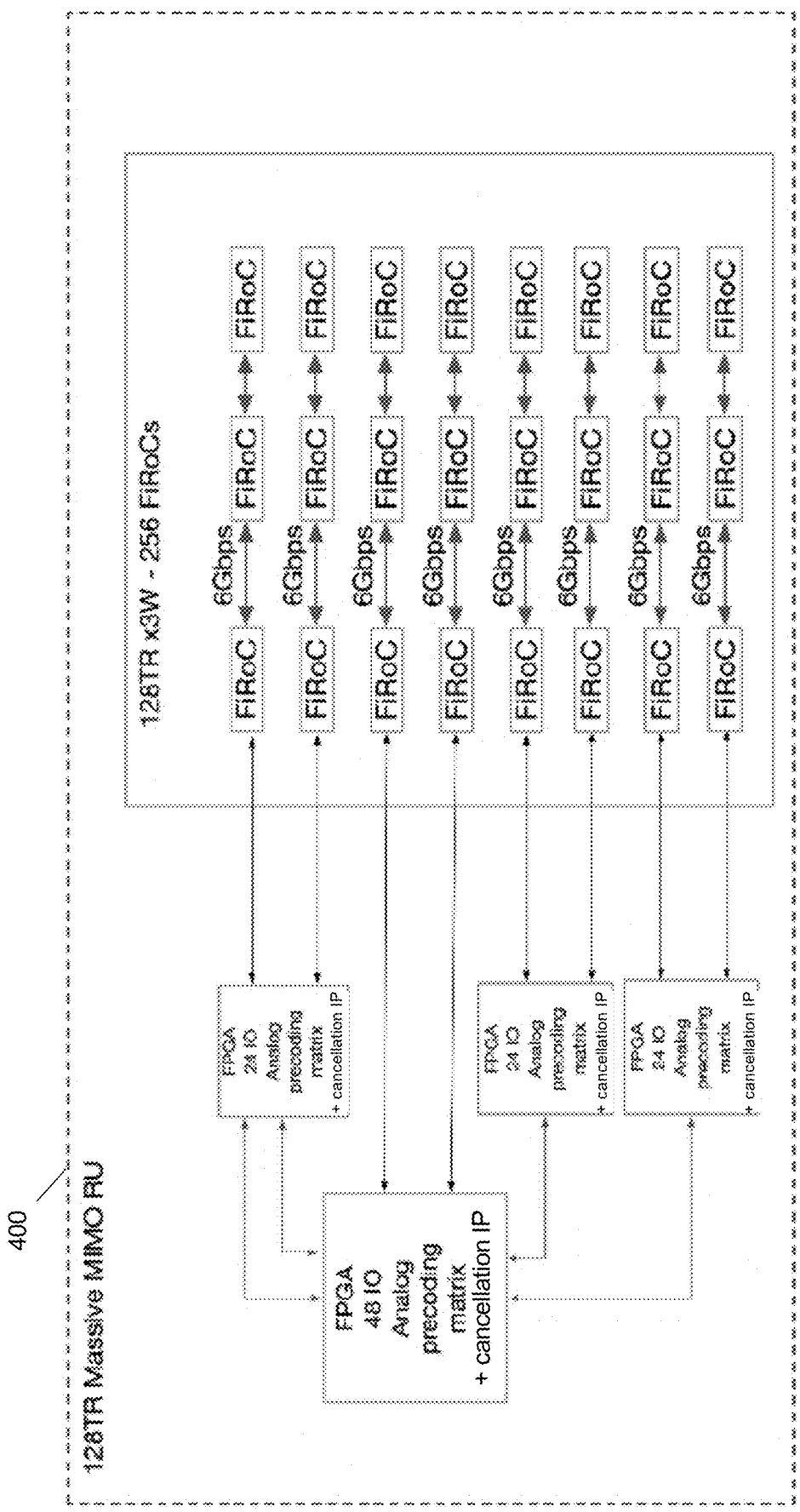
FIG. 4 is a diagram of a 128 TR 5 g STAR PACE array, in accordance with some embodiments.

In some embodiments, this interference cancellation aggregation is implemented with a tile-based architecture for scaling massive MIMO solutions as shown in the system block diagram 400 of FIG. 4 (showing one tile).

This tile-based PCB solution will minimize the data throughput transfer between each of the radio units and satisfy the previously-unachievable SERDES throughput requirement and latency budgets required, thus making STAR possible for 128 TR 5G STAR PACE Arrays.

| | |
| --- | --- |
| Enhanced radar interference cancellation | 5G base stations with high gain receive will detect radar operating at significant distance. Ultimately, STAR enables Tactical 5G base stations to coexist and operate with existing radar systems. A local radar-aware interference canceler at 5G base stations and 5G UEs can eco-exist with interference from radar systems and waveforms. |
| Evolution path for FDD to STAR | STAR creates incentive for site sharing in 5G that when brought to FDD bands can greatly simplify site complexity from complex FDD filtering requirements. This provides an easier foundation for the continued evolution of the current 4G and 5G network to all STAR capabilities with double bandwidth in 6G everywhere. |

For use in UEs, in some embodiments, the same microelectronics for STAR UEs can be used as "fixed wireless UEs"—providing DL on the pre-existing UL will provide a 33% increase in DL capacity with typical 75:25 DL:UL splits. Furthermore, enhancing the scheduler to use UL on pre-existing DL, will provide further increases in spectrum utilization.

We use the same low-cost semiconductor for analog beamformed fixed wireless UE arrays that can automatically provide the smallest RF footprint (narrow beams) and maximizing spectrum re-use alongside legacy non-STAR UEs, in some embodiments. We modify the RFFE ASIC device in two ways: the LNA used can accommodate additional RF injection; the RFIC has an additional transmitter to provide that RF injection to LNA. The RFIC digital processing can also accommodate direct IQ stream injection. We increase size of SERDES into RFFE so it can get "required information" from the "brain/beamformer" to the RFIC for both digital and analog injection. Also, we increase size of beamformer device so that it can compute your filters—can be FPGA/GPU or possible accelerator ASIC attached as well. STAR UEs with analog beamforming are thereby enabled.

We use the exact Option 7.1 interface, in some embodiments, to communicate the interference compensation information, effectively introducing a secondary IQ stream to cancel interference.

One of the advantages of Fi-RoC is simple linearization—thus at the point of aggregation in beamformer we can likely predict what it will do OR we can afford a duplicative computation of the linearization; we can communicate any constants specific to a PA upstream from the 7.1 interface at the Fi-RoC. Either full replication or simple prediction can be used, in some embodiments. Prediction using an ML (machine learning) model at the beamformer could be used to do this, and the ML processing could be done on the same chip or using an FPGA coupled to the Fi-RoC chip, in some embodiments.

Use Cases

Multiple co-located tactical radio systems can transmit and receive simultaneously in the same spectrum using this multi-device STAR communication, with a significant increase in operational efficiency as it doubles the instantaneous bandwidth. It also removes the need to schedule or otherwise coordinate transmission from co-located devices, significantly reducing latency. It eliminates the need to retransmit disrupted transmissions, further reducing latency, and it minimizes the required spectrum allocation for a given platform, or organization. The net result is an increase in total network throughput of 2-10× without requiring any modification to existing radio systems.

Use Case #1: Deployment of multiple handheld and/or vehicle mounted communication device on a mobile Command, Control, Communications, Computer, Intelligence, Surveillance, and Reconnaissance (C4ISR) platform. The platforms support intra-unit communication as well as backhaul/relay (via Line of Sight (LOS), Beyond Line of Sight (BLOS) and Satellite Communication (SATCOM)) capabilities via distinct devices or multi-channel integrated devices. A STAR module is integrated as an RF front end to these devices. This module enables multi-device STAR by eliminating interference between the systems and mitigating interference from external systems.

Use Case #2: Deployment of multiple communication systems in a fixed site leveraging a shared, fiber remoted antenna system. A STAR module is integrated as an RF relay between the radios and the optical carrier. Similar to the first use case the STAR module can allow continuous transmission and reception over all channels from multiple devices—allowing increased throughput while using the common, remoted antenna system.

Use Case #3: Deployment of multiple co-located satellite devices operating in STAR mode in a narrow spectrum to achieve a 2× improvement in satellite bandwidth. In this scenario the STAR module acts as a form of diplexer, however with the ability to operate in the same amount of spectrum currently accessed by a single satellite device.

Use Case #4: Deployment of colocated tactical communication systems and EW systems on a mobile C4ISR platform. The STAR module can allow continuous transmission and reception over all channels in the presence of adjacent or in band EW effects (from electronic attack (EA) or active sensing). The module can demonstrate the ability to cancel interference and enable STAR in dynamic environments that include time varying multi-path reflections.

For use cases #1 and #2 the STAR module provides an interference cancellation front end to enable concurrent transmit and receive from multiple co-located radios operating in the same or adjacent bands. For use case #3 (satellite) the STAR module acts as an active diplexer to double instantaneous bandwidth in the same spectrum, increasing total SATCOM throughput for transmission of streaming sensor feeds. For use case #4 the STAR module supports simultaneous operation of co-located EW and communication systems.

Further details concerning the RF chain described herein are found in U.S. Provisional Pat. App. No. 62/712,172, entitled "System and Method for Massive MIMO Communication" and filed Jul. 30, 2018, as well as any applications that depend therefrom, each hereby incorporated by reference in its entirety for all purposes.

Figure 5:
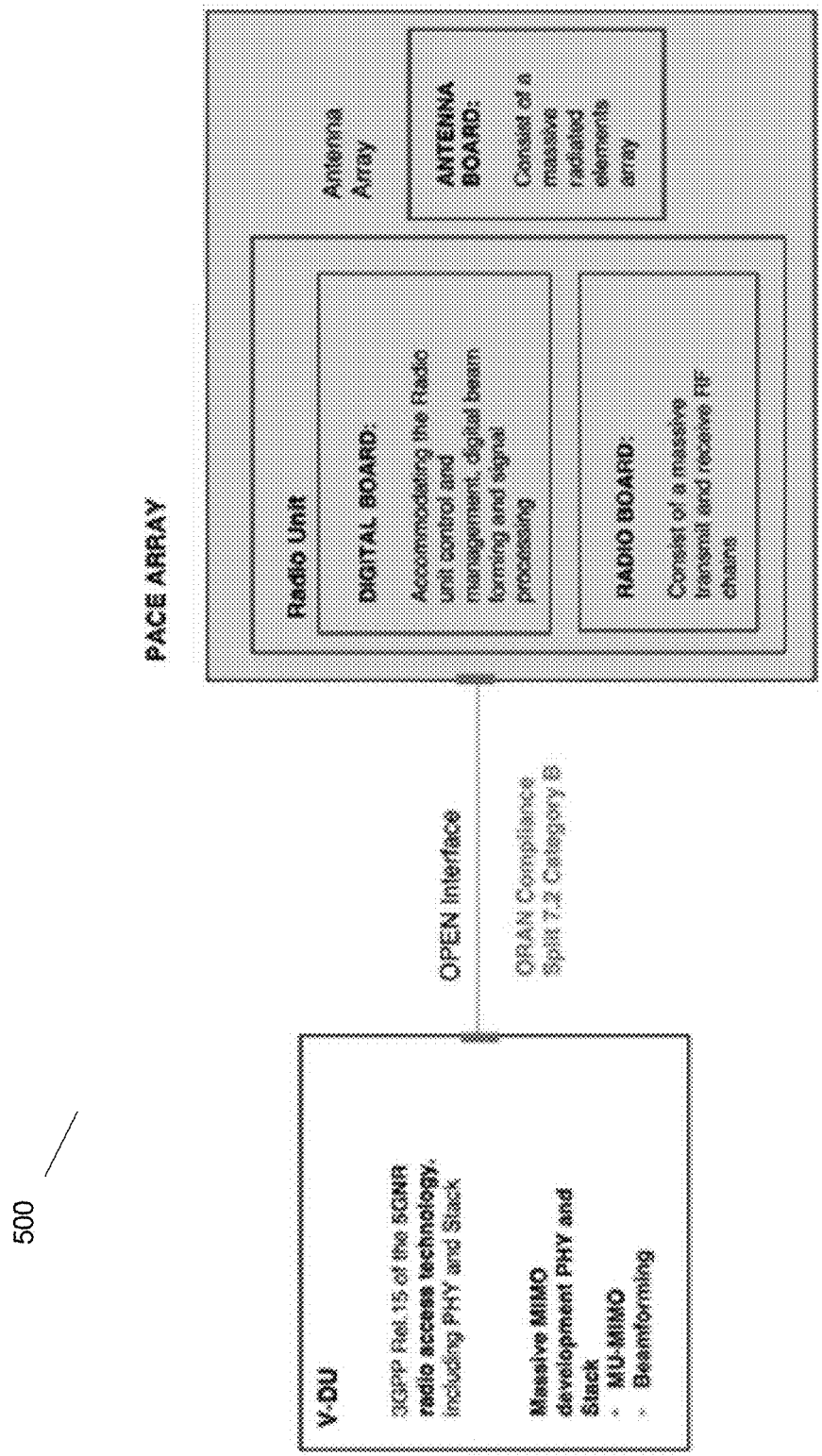
FIG. 5 is a block diagram of a PACE array, in accordance with some embodiments.

FIG. 5 shows an example PACE array 500, including a radio unit having a radio board and a digital board. The PACE array also includes and an antenna array including an antenna board.

Figure 6:
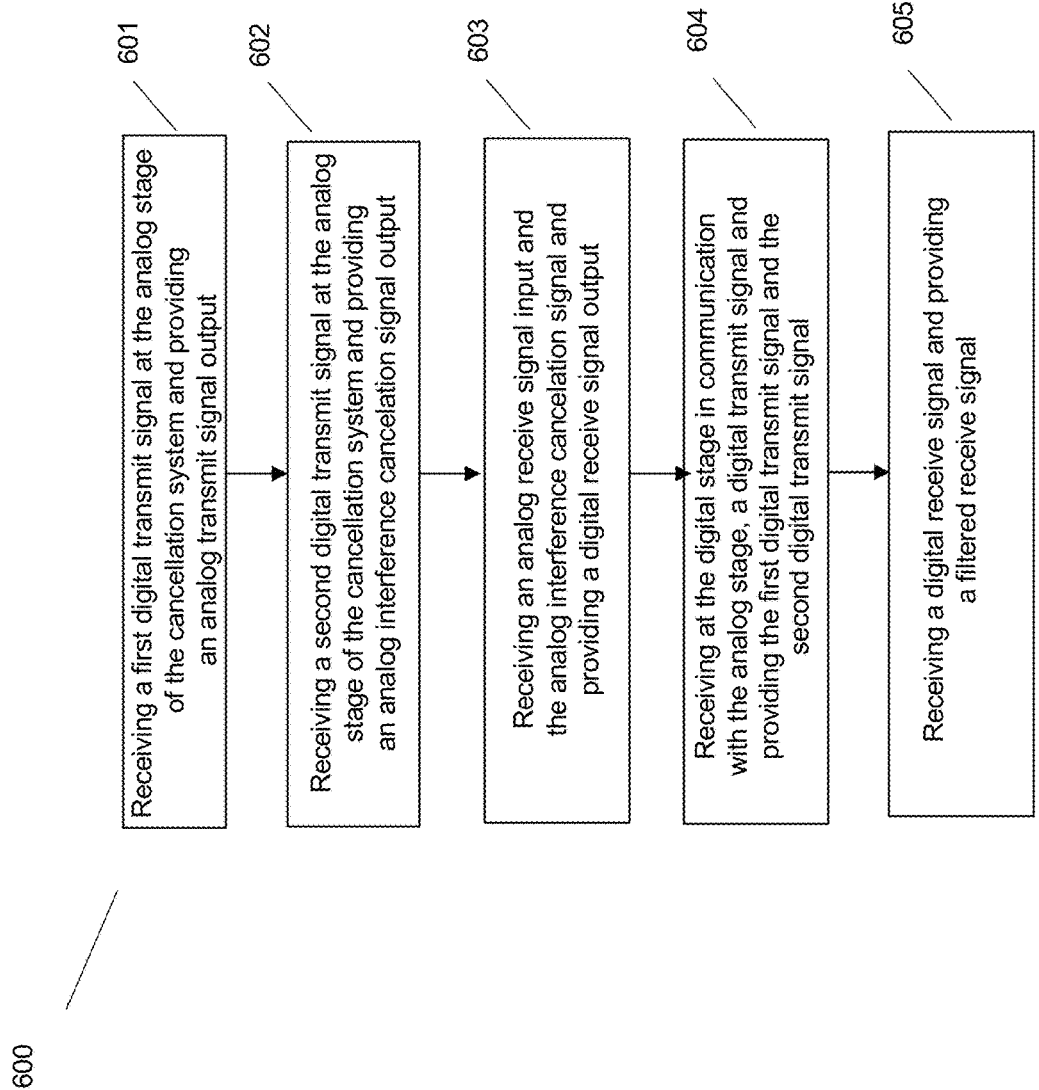
FIG. 6 is a flow diagram of a method for providing interference cancellation, in accordance with some embodiments.

FIG. 6 is a flow diagram showing illustrative processing, according to embodiments of the disclosure. In some embodiments, rectangular elements (typified by element 601 in FIG. 6), herein denoted "processing blocks," represent computer software instructions or groups of instructions. In other embodiments, processing blocks may represent steps performed by functionally equivalent circuits such as a digital signal processor (DSP) circuit or an application specific integrated circuit (ASIC). The flow diagrams do not depict the syntax of any particular programming language but rather illustrate the functional information one of ordinary skill in the art requires to fabricate circuits or to generate computer software to perform the processing required of the particular apparatus. It should be noted that many routine program elements, such as initialization of loops and variables and the use of temporary variables may be omitted for clarity. The particular sequence of blocks described is illustrative only and can be varied without departing from the spirit of the concepts, structures, and techniques sought to be protected herein. Thus, unless otherwise stated, the blocks described below are unordered meaning that, when possible, the functions represented by the blocks can be performed in any convenient or desirable order.

Referring now to FIG. 6 a flow diagram of an example embodiment of a method of providing interference cancellation for simultaneous transmit and receive by a cancellation system having a digital stage and an analog stage 600 is shown. The method begins with processing block 601, which discloses receiving a first digital transmit signal at the analog stage of a cancellation system and providing an analog transmit signal output. Processing block 602 shows receiving a second digital transmit signal at the analog stage of the cancellation system and providing an analog interference cancellation signal output. Processing block 603 recites receiving an analog receive signal input and the analog interference cancelation signal and providing a digital receive signal output. Processing block 604 discloses receiving at the digital stage in communication with the analog stage, a digital transmit signal and providing the first digital transmit signal and the second digital transmit signal. Processing block 605 states receiving the digital receive signal and providing a filtered receive signal.

Figure 7:
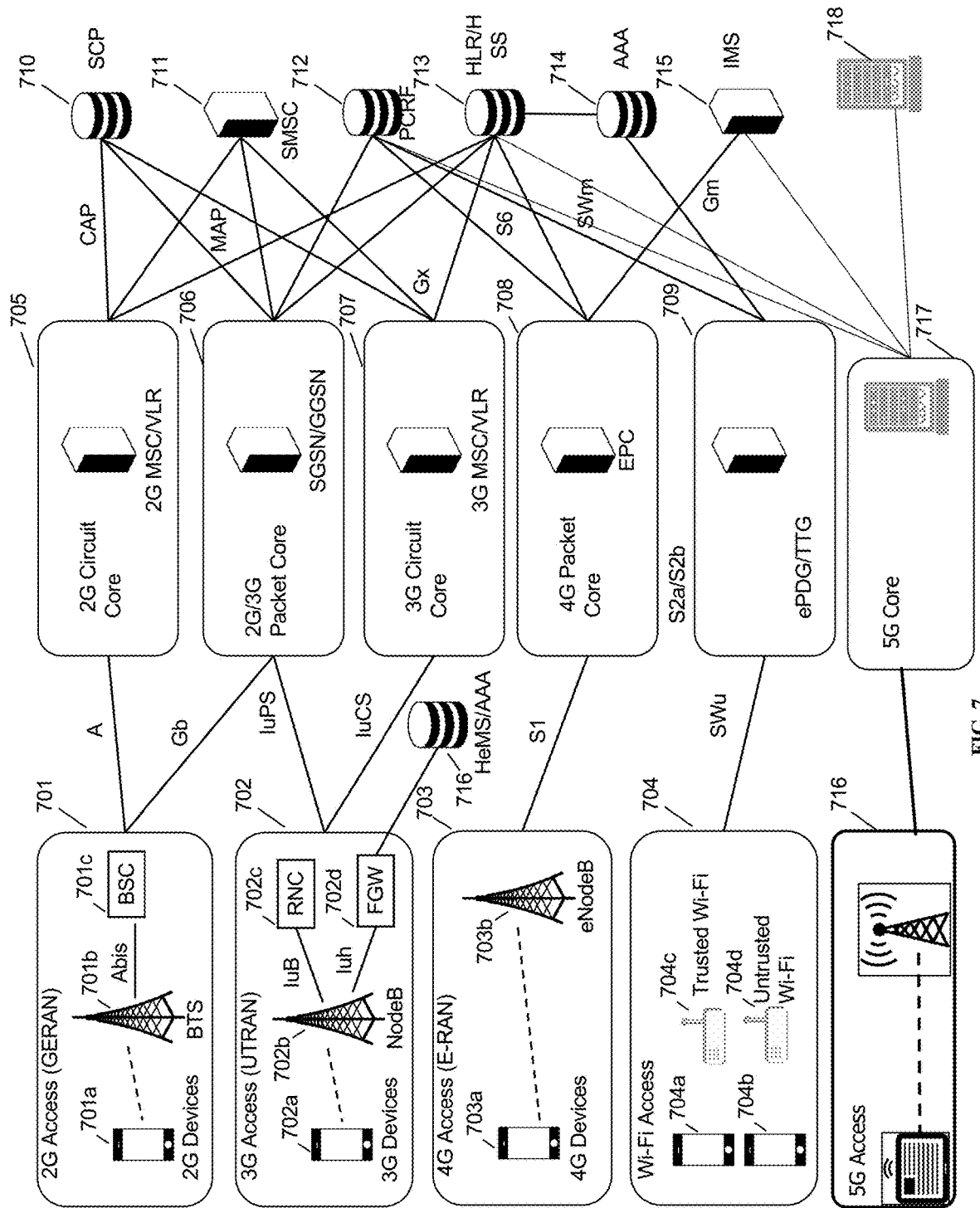
FIG. 7 is a schematic network architecture diagram for various radio access technology core networks.

FIG. 7 is a schematic network architecture diagram for 3G and other-G prior art networks. The diagram shows a plurality of "Gs," including 2G, 3G, 4G, 5G and Wi-Fi. 2G is represented by GERAN 701, which includes a 2G device 701*a*, BTS 701*b*, and BSC 701*c*. 3G is represented by UTRAN 702, which includes a 3G UE 702*a*, nodeB 702*b*, RNC 702*c*, and femto gateway (FGW, which in 3GPP namespace is also known as a Home nodeB Gateway or HNBGW) 702*d*. 4G is represented by EUTRAN or E-RAN 703, which includes an LTE UE 703*a* and LTE eNodeB 703*b*. Wi-Fi is represented by Wi-Fi access network 704, which includes a trusted Wi-Fi access point 704*c* and an untrusted Wi-Fi access point 704*d*. The Wi-Fi devices 704*a* and 704*b* may access either AP 704*c* or 704*d*. In the current network architecture, each "G" has a core network. 2G circuit core network 707 includes a 2G MSC/VLR; 2G/3G packet core network 706 includes an SGSN/GGSN (for EDGE or UMTS packet traffic); 3G circuit core 707 includes a 3G MSC/VLR; 4G circuit core 708 includes an evolved packet core (EPC); and in some embodiments the Wi-Fi access network may be connected via an ePDG/TTG using S2a/S2b. Each of these nodes are connected via a number of different protocols and interfaces, as shown, to other, non-"G"-specific network nodes, such as the SCP 730, the SMSC 731, PCRF 732, HLR/HSS 733, Authentication, Authorization, and Accounting server (AAA) 734, and IP Multimedia Subsystem (IMS) 737. An HeMS/AAA 736 is present in some cases for use by the 3G UTRAN. The diagram is used to indicate schematically the basic functions of each network as known to one of skill in the art, and is not intended to be exhaustive. For example, 7G core 717 is shown using a single interface to 7G access 716, although in some cases 7G access can be supported using dual connectivity or via a non-standalone deployment architecture.

Noteworthy is that the RANs 701, 702, 703, 704 and 736 rely on specialized core networks 707, 706, 707, 708, 709, 737 but share essential management databases 730, 731, 732, 733, 734, 737, 738. More specifically, for the 2G GERAN, a BSC 701*c* is required for Abis compatibility with BTS 701*b*, while for the 3G UTRAN, an RNC 702*c* is required for Iub compatibility and an FGW 702*d* is required for Iuh compatibility. These core network functions are separate because each RAT uses different methods and techniques. On the right side of the diagram are disparate functions that are shared by each of the separate RAT core networks. These shared functions include, e.g., PCRF policy functions, AAA authentication functions, and the like. Letters on the lines indicate well-defined interfaces and protocols for communication between the identified nodes.

The system may include 5G equipment. 5G networks are digital cellular networks, in which the service area covered by providers is divided into a collection of small geographical areas called cells. Analog signals representing sounds and images are digitized in the phone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a common pool of frequencies, which are reused in geographically separated cells. The local antennas are connected with the telephone network and the Internet by a high bandwidth optical fiber or wireless backhaul connection.

5G uses millimeter waves which have shorter range than microwaves, therefore the cells are limited to smaller size. Millimeter wave antennas are smaller than the large antennas used in previous cellular networks. They are only a few inches (several centimeters) long. Another technique used for increasing the data rate is massive MIMO (multiple-input multiple-output). Each cell will have multiple antennas communicating with the wireless device, received by multiple antennas in the device, thus multiple bitstreams of data will be transmitted simultaneously, in parallel. In a technique called beamforming the base station computer will continuously calculate the best route for radio waves to reach each wireless device, and will organize multiple antennas to work together as phased arrays to create beams of millimeter waves to reach the device.

Figure 8:
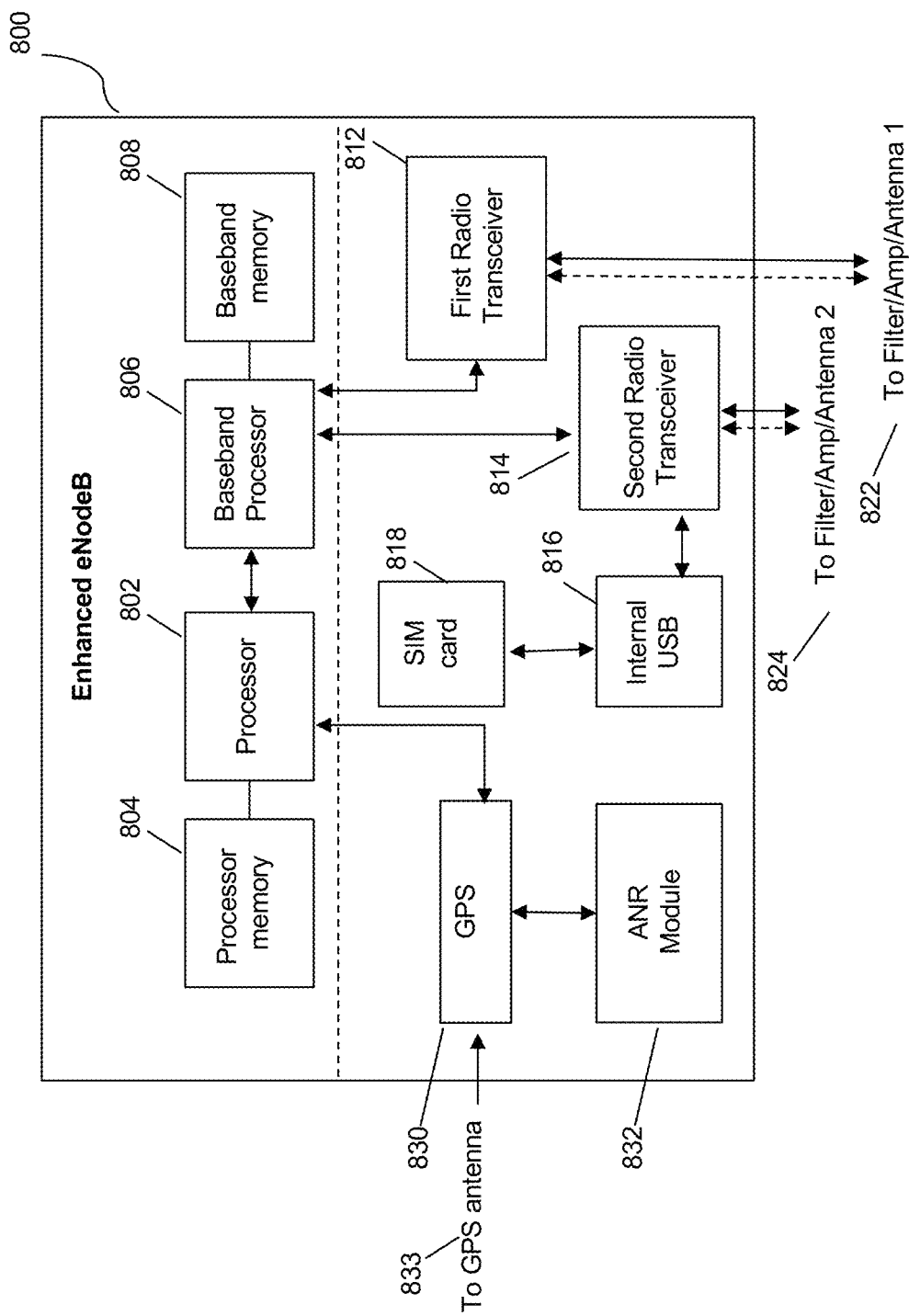
FIG. 8 is an enhanced eNodeB for performing the methods described herein, in accordance with some embodiments.

FIG. 8 is an enhanced eNodeB for performing the methods described herein, in accordance with some embodiments. Mesh network node 800 may include processor 802, processor memory 804 in communication with the processor, baseband processor 808, and baseband processor memory 808 in communication with the baseband processor. Mesh network node 800 may also include first radio transceiver 812 and second radio transceiver 814, internal universal serial bus (USB) port 818, and subscriber information module card (SIM card) 818 coupled to USB port 818. In some embodiments, the second radio transceiver 814 itself may be coupled to USB port 818, and communications from the baseband processor may be passed through USB port 818. The second radio transceiver may be used for wirelessly backhauling eNodeB 800.

Processor 802 and baseband processor 808 are in communication with one another. Processor 802 may perform routing functions, and may determine if/when a switch in network configuration is needed. Baseband processor 808 may generate and receive radio signals for both radio transceivers 812 and 814, based on instructions from processor 802. In some embodiments, processors 802 and 808 may be on the same physical logic board. In other embodiments, they may be on separate logic boards.

Processor 802 may identify the appropriate network configuration, and may perform routing of packets from one network interface to another accordingly. Processor 802 may use memory 804, in particular to store a routing table to be used for routing packets. Baseband processor 808 may perform operations to generate the radio frequency signals for transmission or retransmission by both transceivers 810 and 812. Baseband processor 808 may also perform operations to decode signals received by transceivers 812 and 814. Baseband processor 808 may use memory 808 to perform these tasks.

The first radio transceiver 812 may be a radio transceiver capable of providing LTE eNodeB functionality, and may be capable of higher power and multi-channel OFDMA. The second radio transceiver 814 may be a radio transceiver capable of providing LTE UE functionality. Both transceivers 812 and 814 may be capable of receiving and transmitting on one or more LTE bands. In some embodiments, either or both of transceivers 812 and 814 may be capable of providing both LTE eNodeB and LTE UE functionality. Transceiver 812 may be coupled to processor 802 via a Peripheral Component Interconnect-Express (PCI-E) bus, and/or via a daughtercard. As transceiver 814 is for providing LTE UE functionality, in effect emulating a user equipment, it may be connected via the same or different PCI-E bus, or by a USB bus, and may also be coupled to SIM card 818. First transceiver 812 may be coupled to first radio frequency (RF) chain (filter, amplifier, antenna) 822, and second transceiver 814 may be coupled to second RF chain (filter, amplifier, antenna) 824.

SIM card 818 may provide information required for authenticating the simulated UE to the evolved packet core (EPC). When no access to an operator EPC is available, a local EPC may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 800 is not an ordinary UE but instead is a special UE for providing backhaul to device 800.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 812 and 814, which may be Wi-Fi 802.11a/b/g/n/ac/ad/ah, Bluetooth, ZigBee, microwave (including line-of-sight microwave), or another wireless backhaul connection. Any of the wired and wireless connections described herein may be used flexibly for either access (providing a network connection to UEs) or backhaul (providing a mesh link or providing a link to a gateway or core network), according to identified network conditions and needs, and may be under the control of processor 802 for reconfiguration.

A GPS module 830 may also be included, and may be in communication with a GPS antenna 832 for providing GPS coordinates, as described herein. When mounted in a vehicle, the GPS antenna may be located on the exterior of the vehicle pointing upward, for receiving signals from overhead without being blocked by the bulk of the vehicle or the skin of the vehicle. Automatic neighbor relations (ANR) module 832 may also be present and may run on processor 802 or on another processor, or may be located within another device, according to the methods and procedures described herein.

Other elements and/or modules may also be included, such as a home eNodeB, a local gateway (LGW), a self-organizing network (SON) module, or another module. Additional radio amplifiers, radio transceivers and/or wired network connections may also be included.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

In some embodiments, the software needed for implementing the methods and procedures described herein may be implemented in a high level procedural or an object-oriented language such as C, C++, C#, Python, Java, or Perl. The software may also be implemented in assembly language if desired. The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Other embodiments are within the following claims.

The inventors have contemplated various additional variants of the present disclosure. A single system-on-chip could provide any of the following combinations of circuitry on the same chip: integrated baseband on the same chip; the entire RF chain on another chip, such RF chain including: a software-defined radio (SDR); 2W PA; low-noise amplifier (LNA); filter; DPD and crest factor reduction (CFR) circuitry. Alternately, the baseband chip could be omitted and this functionality could be performed by a general-purpose chip.

Alternately, anywhere a radio chip is mentioned, a software-defined radio (SDR) could be used. Alternately, anywhere an FPGA, which is commonly used to implement an SDR, is mentioned, the FPGA could be replaced by a general purpose chip with a special-purpose accelerator logic circuit built in. Adding FPGA functionality to the digital radio chip is less costly than requiring an FPGA, as it is relatively cheap to add space to an existing die. Additional DPD, CFR functionality could be added to a chip as well. Demodulation, decoding, and analysis/control could be performed by circuitry either on the same chip as the RF chain or baseband chip, or on a general purpose chip, or on an FPGA, or via accelerators.

Where 6G is described, the inventors have contemplated the use of the most recent 6G standards available, including the standards currently being developed by the $3^{rd}$ Generation Partnership Project (3GPP). The technologies described herein are not limited to 6G and can be used to provide 4G signaling, 5G signaling, 6G signaling, or a combination thereof and may be used in a network supporting one or more of the abovementioned wireless standards.

Some embodiments of an apparatus may include: a plurality of transceiver modules configured in an antenna array; a synchronization transmission circuit configured to transmit a synchronization signal to the plurality of transceiver modules; a receive carrier generation circuit configured to generate a receive carrier reference signal; and a synchronization processing circuit configured to process the synchronization signal and to align a phase of the receive carrier reference signal.

Some embodiments of an apparatus may include: a plurality of transceiver modules arranged in an array and configured to receive a digital baseband signal; a plurality of digital modulators and power amplifiers each configured to generate a transmit modulated signal from the digital baseband signal; and a combiner configured to combine the transmit modulated signals.

Some embodiments of an apparatus may include: a plurality of antenna elements on a panel array; a plurality of transceiver modules arranged on the panel array to be adjacent to one of the plurality of antenna elements and configured to receive a desired signal, wherein each transceiver module may include a plurality of digital demodulators, and includes a baseband signal combiner; a demodulation circuit configured to generate a demodulated baseband signal from each of the transceiver modules; and a combiner configured to combine the digital baseband signals at the panel array using the baseband signal combiners.

In a further embodiment, an omnidirectional antenna is contemplated by the inventors. Antenna elements formed according to the present disclosure are situated all around a single polar axis, enabling beamforming to different users off of a single telephone antenna. A single round antenna with a plurality of elements is considered. The round antenna may be shaped and may provide power for a base station on top of a telephone pole. The round antenna may alternately be an antenna for a single handset. By use of a combination of ganged polar PAs as described herein, beamforming is enabled even in a small antenna package.

The foregoing discussion discloses and describes merely exemplary embodiments of the present invention. As will be understood by those skilled in the art, the present invention may be embodied in other specific forms without departing from the spirit or essential characteristics thereof. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and system can generally be integrated together in a single software product or packaged into multiple software products.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

These functions described above can be implemented in digital electronic circuitry, in computer software, hardware, or firmware. The techniques can be implemented using one or more computer program products. Programmable processors and computers can be included in or packaged as mobile devices. The process and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), readable compact discs (CD-R), rewritable compact discs (CD-RW), read-only digital versatile discs (e.g., DVD-ROM, dual-layer DVD-ROM), a variety of recordable/rewritable DVDs (e.g. DVD-RAM, DVD-RW, DVD+RW, etc.), flash memory (e.g., SD cards, mini-SD cards, micro-SD cards, etc.), magnetic or solid-state hard drives, read-only and recordable Blu-Ray® discs, ultra-density optical discs, any other optical or magnetic media, and floppy disks. The computer-readable media can store a computer program that is executed by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

It will be appreciated that some embodiments may comprise one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Accordingly, some embodiments of the present disclosure, or portions thereof, may combine one or more processing devices with one or more software components (e.g., program code, firmware, resident software, micro-code, etc.) stored in a tangible computer-readable memory device, which in combination form a specifically configured apparatus that performs the functions as described herein. These combinations that form specially programmed devices may be generally referred to herein as "modules." The software component portions of the modules may be written in any computer language and may be a portion of a monolithic code base, or may be developed in more discrete code portions such as is typical in object-oriented computer languages. In addition, the modules may be distributed across a plurality of computer platforms, servers, terminals, and the like. A given module may even be implemented such that separate processor devices and/or computing hardware platforms perform the described functions.

Moreover, an embodiment can be implemented as a computer-readable storage medium having computer readable code stored thereon for programming a computer (e.g., comprising a processor) to perform a method as described and claimed herein. Examples of such computer-readable storage media include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in singular is not intended to mean "one and only one" unless specifically so states, but rather "one or more." Unless expressly stated otherwise, the term "some" refers to one or more. Pronouns in the masculine (e.g., his) include the feminine and neuter gender (e.g., her and its) and vice versa. Headings and subheadings, if any, are used for convenience only, and do not limit the subject technology.

A phrase, for example, an "aspect" or "feature" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations or one or more configurations. A phrase, for example, a configuration may refer to one or more configurations and vice versa.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Accordingly, the disclosure of the present invention is intended to be illustrative of, but not limiting of, the scope of the invention.

The invention claimed is:

1. A system providing interference cancellation for simultaneous transmit and receive, comprising:
   an analog stage including a transmit chain receiving a first digital transmit signal and providing an analog transmit signal output, an auxiliary transmit chain receiving a second digital transmit signal and providing an analog interference cancellation signal output, and a receive chain receiving an analog receive signal input and the analog interference cancellation signal and providing a digital receive signal output; and
   a digital stage in communication with the analog stage, including a cancellation system receiving a digital transmit signal and providing the first digital transmit signal and the second digital transmit signal and receiving the digital receive signal and providing a filtered receive signal,
   wherein the transmit chain comprises a first Digital to Analog (D/A) converter having a first D/A input and a first D/A output, a first mixer having an input in communication with the first D/A output and a first mixer output, and a first power amplifier having an input in communication with the first mixer output and providing a transmit output signal;
   wherein the auxiliary transmit chain comprises a second D/A converter having a second D/A input and a second D/A output, a second mixer having an input in communication with the second D/A output and a second mixer output, and an amplifier having an input in communication with the second mixer output and providing an interference cancellation signal output; and
   wherein the receive chain comprises a low noise amplifier receiving an analog receive input signal and an interference cancellation signal and providing an analog receive signal output, a third mixer having an input in communication with the low noise amplifier output and a third mixer output, and a Analog to Digital (A/D) converter having a first A/D input and a first A/D output, and a second power amplifier having an input in communication with the first mixer output and providing a digital transmit output signal.

2. The system of claim 1 wherein the analog stage provides a first stage of cancellation and reduces a highest interference signal wherein a resulting residual signal is within a dynamic range of an Analog to Digital (A/D) converter and a Digital to Analog (D/A) converter.

3. The system of claim 1 wherein the cancellation system includes a first transmit signal input and processes a first transmit signal to provide a first transmit output signal and a second transmit output signal, and having a first receive signal input and processes the digital receive signal to provide the filtered receive signal.

4. The system of claim 1 wherein the digital stage cancels multi-path reflections from nearby scatterers that also interfere with the weak receive signal and removes adjacent channel leakage or out-of-band emissions into neighboring channels.

5. The system of claim 1 wherein the analog stage provides the cancellation of a high power signal before it enters the receive chain.

6. The system of claim 1 wherein the digital stage controls the analog stage to adapt with changing channel conditions and provides delay and amplitude control mechanisms to provide cancellation.

7. The system of claim 1 wherein the digital stages cancels a remaining residual interference signal which can comprise linear and non-linear leakage from the transmitter.

8. A method comprising:
   obtaining pair-wise antenna interference channel measurements by transmitting a calibration signal from each of a plurality of antenna array elements using a corresponding array of transmit signal processing chains, and responsively measuring a self-interference channel to each of the other of the plurality of antenna array elements using a corresponding array of receive signal processing chains;

receiving a plurality of digital transmit signals, each of the plurality of digital transmit signals representing digital-beamformed transmit data for transmission by the array of transmit signal processing chains;

generating, for each respective receive signal processing chain in the array of receive signal processing chains, a digital auxiliary interference cancelation signal based on the pair-wise antenna interference channel measurements associated with the each respective receive signal processing chain and the associated corresponding digital transmit signal;

at each antenna element, transmitting, using a transmit signal processing chain of the array of transmit signal processing chains, a transmit signal generated from a corresponding digital transmit signal from the plurality of digital transmit signals; and, reducing self-interference at each receive signal processing chain by injecting into the receive signal processing chain, a corresponding auxiliary interference cancelation signal generated from the digital auxiliary interference cancelation signal.

9. The method of claim 8 wherein the pair-wise antenna interference channel measurements are obtained by sequentially (i) transmitting the calibration signal from each respective antenna element and (ii) measuring the interference at each other antenna element.

10. The method of claim 8 wherein the pair-wise antenna interference channel measurements are obtained by transmitting orthogonal calibration signals from at least a subset of the antenna elements and simultaneously measuring the interference at each other antenna element.

11. The method of claim 8, wherein the plurality of digital transmit signals are generated by a digital beam forming processor and are received by an interference cancellation system.

12. The method of claim 11, wherein the digital interference cancellation system generates a given digital auxiliary interference cancelation signal for a given receive signal processing chain in the frequency domain by forming a sum of the respective products of the pair-wise antenna interference channel measurements and the corresponding digital transmit signals.

13. The method of claim 8 wherein the digital transmit signals and the digital auxiliary interference cancellation signal are inphase and quadrature magnitudes for a plurality of orthogonal frequency division multiplexed subcarriers.

14. The method of claim 8 wherein the pair-wise antenna interference channel measurements comprise, for each antenna in the antenna array, a self-interference measurement and a set of interference measurements from at least a subset of antennas in the array.

15. The method of claim 14 wherein each antenna has a polarization and wherein the subset of antennas in the array are antenna elements having a same polarization.

* * * * *